United States Patent [19]

Motlagh

[11] Patent Number: 5,861,223
[45] Date of Patent: Jan. 19, 1999

[54] COMBINATION SPRING LOADED BATTERY TERMINAL POST CONNECTOR AND PROTECTIVE HOUSING AND METHOD THEREFOR

[76] Inventor: Mojtaba R. Motlagh, 2131 Americas Cup Cir., Las Vegas, Nev. 89117-1925

[21] Appl. No.: 820,732

[22] Filed: Mar. 19, 1997

[51] Int. Cl.⁶ .................................................. H01M 2/28
[52] U.S. Cl. ........................ 429/121; 429/178; 439/754; 439/759
[58] Field of Search .................................... 439/754, 756, 439/757, 759; 429/121, 178; 320/105

[56] References Cited

U.S. PATENT DOCUMENTS

| | | |
|---|---|---|
| 2,250,841 | 7/1941 | Randall . |
| 2,470,104 | 5/1949 | Martin . |
| 2,548,782 | 4/1951 | Goodnight . |
| 2,589,122 | 3/1952 | Olson . |
| 4,470,654 | 9/1984 | Friedman ................................ 339/95 B |
| 4,778,408 | 10/1988 | Morrison .................................. 439/522 |
| 5,082,456 | 1/1992 | Lan ........................................... 439/505 |
| 5,678,450 | 10/1997 | Azamber et al. ........................ 339/226 |

*Primary Examiner*—Maria Nuzzolillo
*Assistant Examiner*—Carol Chaney
*Attorney, Agent, or Firm*—Harry M. Weiss; Jeffrey D. Moy; Harry M. Weiss & Associates, P.C.

[57] ABSTRACT

A battery terminal post connector in one embodiment includes a spring that urges a lower body towards an upper body when a battery terminal post is disposed therebetween. The urging of the spring causes an electrical connection between the connector and the post. A protective housing protects the connector and the battery terminal post. In another embodiment, a pair of springs are used to create a spring biased connection between lower and upper bodies and a battery terminal post. Thus, in both embodiments, a quick connect/quick disconnect function is achieved for each of the two connectors with respect to each associated battery terminal.

19 Claims, 2 Drawing Sheets

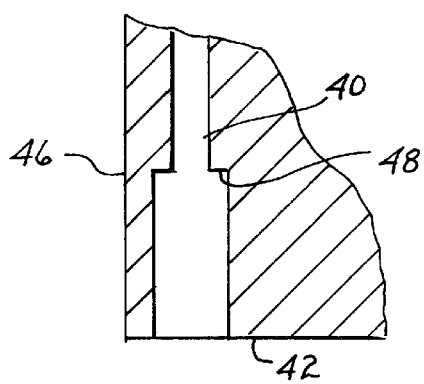
Fig. 1 (PRIOR ART)
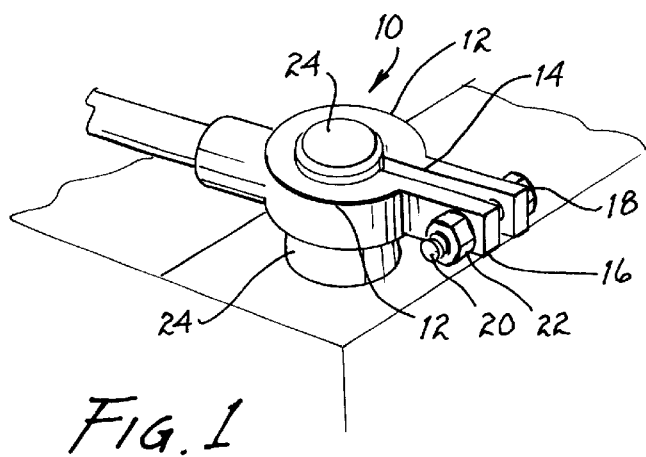
Fig. 2
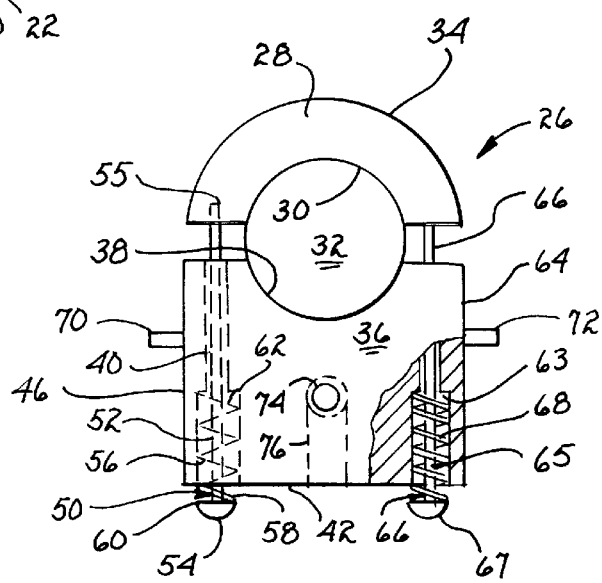
Fig. 3
Fig. 4

COMBINATION SPRING LOADED BATTERY TERMINAL POST CONNECTOR AND PROTECTIVE HOUSING AND METHOD THEREFOR

BACKGROUND OF THE INVENTION

1. Field of Invention:

This invention is in the general field of connectors for electrical equipment and methods therefor and, more particularly, is an improved method and apparatus for providing a quick connect/quick disconnect between a connector and a terminal of a battery and also a protective case for protecting the terminals and the quick connect/quick disconnect connector to the terminal.

2. Description of the Prior Art:

A storage battery is, for example, used in a motor vehicle for providing electrical power to operate a starter, operate electric door locks, open and close electrically operated windows, operate a cigar lighter, operate stereo equipment and operate other types of electrical equipment. The battery is typically mounted near the engine of the vehicle. The electric power is provided via battery cables that are connected to terminal posts of the battery.

Usually, a flexible metal terminal post connector is bolted onto a terminal post. A bare electrical end of an insulation coated battery cable is connected to the connector. Since the connector is metal, an electrically conductive path is provided from the post to the cable through the connector. The use of the bolt is essential to maintaining a reliable electrical connection between the cable and the post. Because of the use of the bolt, the connector does not have a quick connect/quick disconnect feature whereby the connector can be easily and reliably connected to or removed from the post.

Another problem associated with connectors for a battery terminal or post is that corrosion between the battery terminal or post could and would create, in effect, an electrical open between the battery terminal or post and the connector mechanically connected thereto. In order to remove this corrosion which often resulted in the creation of a non-conductive layer between the battery terminal or post and the connector, it was necessary to separate the two items, namely, the battery terminal or post and the connector and to clean or scrape off the non-conductive corrosion layer that usually formed on both the contacting regions of the battery terminal or post and the connector. This cleaning or scraping process was not only time consuming, but it was also a somewhat difficult process which often resulted in only a temporary fix of the problem which problem often came back quickly because of the failure to remove all of the corrosive material.

As a result, various battery caps were developed such as the type shown in U.S. Pat. No. 5,432,026 to Cox, U.S. Pat. No. 5,403,678 to Fields, U.S. Pat. No. 5,346,782 to Julian, U.S. Pat. No. 5,021,306 to Turner and U.S. Pat. No. 5,016,643 to English. U.S. Pat. No. 4,698,469 to Drake is directed to a case to protect the electrical connection between the battery terminal post and the end of a battery cable (connector) that was attached to the post.

None of these prior art patents disclosed the combination of a quick attach or connect/quick detach or disconnect battery terminal post connector that is enclosed within protective housing that protects both the connector and the battery terminal or post connector and that can be, if desired, operated (the connector can be connected to or disconnected from the battery terminal post) even by a person using one hand, if necessary.

Accordingly, there is a need for a combined battery terminal post connector with the quick connect/quick disconnect feature that maintains the reliable electrical connection between the cable and the post and a protective housing to protect both the battery terminal post and the connector thereto.

SUMMARY OF THE INVENTION

An object of the present invention is an improved method and apparatus that provides a quick connect/quick disconnect of a connector attached to a battery cable to a terminal post of a battery.

BRIEF DESCRIPTION OF THE PREFERRED EMBODIMENT

According to the present invention, a battery terminal post connector has a lower body and an upper body. When the bodies are disposed with a terminal post of a battery therebetween, the lower body is preferably urged towards the upper body by a spring. Thus the invention provides a spring loaded battery terminal post connector where the position of a component of the connector is manually altered to provide for a quick connect/quick disconnect of the connector. A protective housing is also provided to incorporate therein the battery terminal post connector of this invention.

Other objects, features, and advantages of the invention should be apparent from the following description of embodiments thereof as illustrated in the accompanying drawing.

BRIEF DESCRIPTION OF THE DRAWING

FIG. 1 is a perspective view of a battery terminal post connector in accordance with the prior art;

FIG. 2 is a plan view, with parts broken away, of a first embodiment of the present invention showing a battery post connector;

FIG. 3 is an enlarged section of a portion of FIG. 2;

FIG. 4 is a plan view of a second battery post connector embodiment of the present invention showing this connector within a protective housing;

DESCRIPTION OF THE EMBODIMENTS

Figure 5:
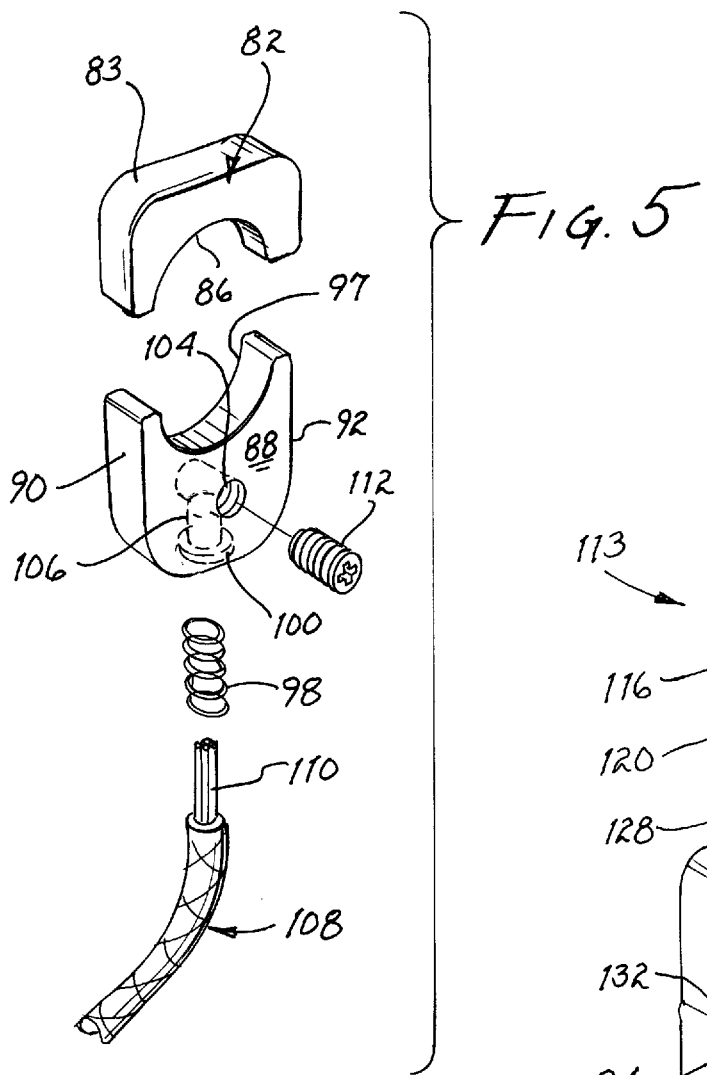
FIG. 5 is an exploded view of a portion of the battery post connector embodiment of FIG. 4.

As shown in FIG. 1, a battery terminal post connector 10 of the prior art includes a flexible metal ring 12 with a discontinuity 14 therein. On one side of the discontinuity 14, the ring 12 is integrally connected to an arm 16. On the other side of the discontinuity 14, the ring 12 is integrally connected to an arm 18. The arm 18 is similar to the arm 16.

The arms 16, 18 have substantially aligned holes with a bolt 20 therethrough. A nut 22 is screwed onto the bolt 20. Accordingly, the size of the discontinuity 14 is reduced by tightening the nut 22. Correspondingly, the size of the discontinuity 14 is increased by either loosening or removing the nut 22.

A terminal post 24 of a battery is within the ring 12. From the explanation given hereinbefore, the nut 22 is tightened to maintain a reliable electrical connection between the connector 10 and the post 24. As explained hereinafter, the present invention obviates the tightening and loosening of a nut or the need for a nut and bolt fastening arrangement.

As shown in FIG. 2, in a first embodiment of the present invention, a battery terminal post connector 26 is comprised of an electrically conductive upper body 28 that has an arcuate battery terminal post contact surface 30 at its lower end. The radius of curvature of the contact surface 30 preferably approximates the radius of curvature of a battery terminal post 32.

In this embodiment, the upper body 28 has an outer arcuate surface 34 at it's upper end that is concentric with the contact surface 30. It should be understood that the shape of the upper end of the upper body 28 is not of critical importance, however, the arcuate shaped configuration, as shown in FIG. 2 is preferred because of simplicity and less cost.

The connector 26 is additionally comprised of an electrically conductive lower body 36 that preferably has the general shape of a rectangular parallelpiped. An upper end 37 of the lower body 36 includes an arcuate battery terminal post contact surface 38. The contact surface 38 of the lower body 36 is similar to the contact surface 30 of the upper body 28. The contact surfaces 30, 38 are maintained in contact with the side of the post 32 in a manner described hereinafter.

The lower body 36 has a first hole 40 that extends from a lower end 42 of the lower body 36 to the upper end 37. The hole 40 is preferably adjacent to a side 46 of the lower body 36. Additionally, a central axis (not shown) of the hole 40 is preferably substantially parallel to the side 46.

As best shown in FIG. 3, the hole 40 has an enlarged diameter that extends from the lower end 42 to approximately midway between the ends 37, 42. The remainder of the hole 40 is of a reduced diameter. Because of the enlarged and reduced diameters, a shoulder 48 is formed within the hole 40.

A first rod 50 (FIG. 2) has a shank 52 that passes completely through the hole 40. Additionally, a proximal end 54 of the rod 50 is preferably in the shape of a bolt head. The end 54 is adjacent to the lower end 42 on the outside of the hole 40. A distal end 55 of the rod 50 is preferably fixedly connected within an opening in the lower end portion of the upper body 28.

The shank 52 passes substantially coaxially through a coil spring 56. An outer end 58 of the spring 56 abuts a shoulder 60 formed by the end 54. An inner end 62 of the spring 56 abuts the shoulder 48 (FIG. 3). When the bodies 28, 36 are disposed with the post 32 therebetween, the spring 56 is compressed thereby providing a spring biased contact of the bodies 28, 36 with respect to the battery terminal post 32.

The lower body 36 preferably also has a second hole 63 that extends from the lower end 42 to the upper end 37. The hole 63 is adjacent to a side 64 of the lower body 36. The second hole 63 is preferably similar to the first hole 40.

A second rod 66 has a shank 65 that passes through the hole 63 in a manner similar to the passing of the shank 52 through the hole 40. Like the first rod 50, the second rod 66 has a proximal end 67 in the shape of a bolt head. Moreover a distal end (not shown) of the rod 66 is fixedly connected within the upper body 28 in a manner similar to the connection of the end 55.

The rod 66 passes substantially coaxially through a coil spring 68 in a manner similar the rod 50 passing through the spring 56. Additionally, ends of the spring 68 respectively abut a shoulder (not shown) within the hole 63 and a shoulder of the end 67 in a manner similar to the abutting of the ends 58, 62 and the shoulders 48, 60, respectively.

When the bodies 28, 36 are disposed with the post 32 therebetween, the spring 68 is also compressed between the shoulder within the hole 63 and the shoulder of the end 67. Because the springs 56, 68 are compressed, this provides a means so that the lower body 36 is urged towards the upper body 28 whereby the surfaces 30, 38 are maintained in a biased spring loaded contact with the abutting sides of the post 32. The maintaining of the contact of the surfaces 30, 38 with the associated sides of the post 32 causes an electrical connection to be maintained between the connector 26 and the post 32.

Handles 70, 72 are preferably fixedly connected in any suitable manner to the sides 46, 64, respectively. The connector 26 is either connected to or removed from the post 32 by a person placing a forefinger and the thumb of one hand on the handle 70 and the end 54, respectively, and placing the forefinger and the thumb of the other hand on the handle 72 and the end 67, respectively. When the forefinger and thumb of each hand are pressed towards each other, the lower body 36 moves away from the upper body 28 whereby the connector 26 is easily and rapidly connected to the post 32 or disconnected therefrom, as desired. Accordingly, the connector 26 has a quick connect/quick disconnect feature.

The lower body 36 has a threaded vertical hole 74 therein. The vertical hole 74 is intersected by a horizontal hole 76 that extends inwardly from the lower end 42. When an uninsulated end of a battery cable (not shown) is disposed within the hole 76, it is securely retained therein by means of a screw (not shown in FIG. 2, but shown in FIGS. 4 and 6) that is screwed into the hole 74. In this manner, electrical contact is created by a battery terminal wire (not shown) that is located at one end within the hole 76 to the lower body 36 and, correspondingly, to the battery terminal post 32.

As shown in FIGS. 4 and 5, in a second embodiment of the present invention, a battery terminal post connector 78 includes a preferably generally rectangular retention frame 80 with a lower arcuate shaped member 81. An electrically conductive upper body 82 of the connector 78 is disposed within the frame 80. A portion of an upper end 83 of the upper body 82 is preferably fixedly connected to a member 84 of the frame 80.

The upper body 82 includes an arcuate battery terminal post contact surface 86. Preferably, the radius of curvature of the contact surface 86 approximates the radius of curvature of a battery terminal post.

An electrically conductive lower body 88 of the connector 78 is additionally disposed within the frame 80. The lower body 88 has sides 90, 92 (see FIG. 5) that are in slidable contact with side wall members 94, 96, respectively, of the frame 80. Additionally, the lower body 88 has an arcuate battery terminal post contact surface 97 that is similar to the contact surface 86.

A single coil spring 98 is disposed within the frame 80 between the arcuate shaped member 81 and the lower body 88. More particularly, one end of the spring 98 abuts a lower end 100 of the lower body 88. The other end of the spring 98 abuts the inner surface of the arcuate shaped member 81.

When the bodies 82, 88 are disposed with the post 32 (FIG. 2) therebetween, the spring 98 is compressed thereby creating a spring biased electrical contact between the bodies 82, 88 and the post 32 (not shown in FIGS. 4 or 5). Because of the compression, the spring 98 functions as a means to urge the lower body 88 towards the upper body 82, thereby maintaining contact between the surfaces 86, 97 and the post 32. Hence, the urging of the lower body 88 towards the upper body 82 maintains a firm positive electrical contact between the connector 78 and the post 32.

Manually moving the lower body 88 in the direction of an arrow 102 (see FIG. 4), as will be described below, increases a displacement between the bodies 82, 88, whereby the connector 78 may be either connected to the post 32 or removed therefrom. Accordingly, the connector 78 has a quick connect/quick disconnect feature as described below.

The lower body 88 has a threaded vertical hole 104 therein (see FIG. 5). The vertical hole 104 is intersected by a horizontal hole 106 that extends upwardly from the lower end 100. The holes 104, 106 are respectively similar to the holes 74, 76 of the first embodiment of FIG. 2.

A battery cable 108 passes through the spring 98 along its axis (not shown). When an uninsulated end 110 of the cable 108 is disposed within the hole 106, it is securely retained therein by means of a screw 112 that is screwed into the hole 104 (see FIG. 4).

Since the lower body 88 is fixedly connected to the battery cable 108 by means of the screw 112 firmly holding the bare or uninsulated ends 110 and since the lower body 88 is not fixed to the frame 80 (as is the upper body 82), a person holding the battery cable 108 can, with one hand and without any fastening device, simply pull on the cable 108 which causes the lower body 88 to move against the compression force of the spring 98 which causes the two bodies 82, 88 to further separate thereby permitting the connector 78 to be either rapidly attached to the battery terminal post 32 or rapidly detached therefrom thus providing the quick connect/quick disconnect feature of this invention.

Figure 6:
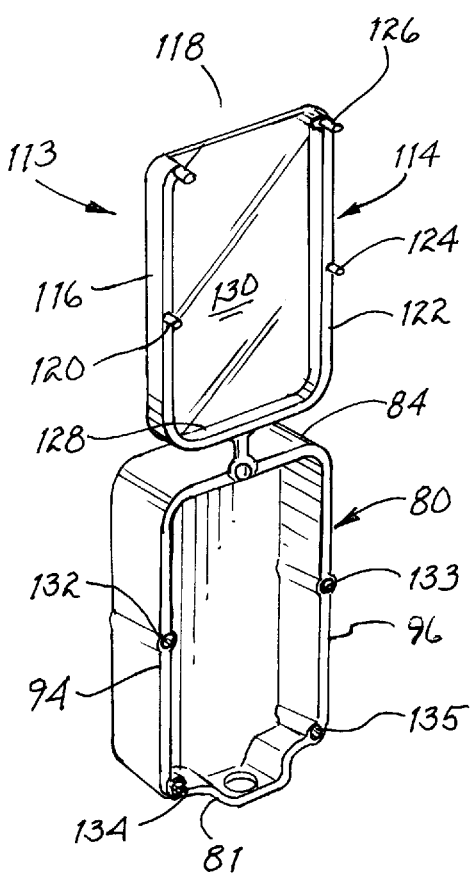
FIG. 6 is a plan view of a protective housing and cover therefor that is used to cover the battery terminal post connector as illustrated in the second embodiment of FIG. 4.

As shown in FIG. 6, a protective cover 113 for protecting the connector 78 from any contamination from an automobile or vehicle engine, for example, includes, for example, a three sided top frame 114 that is preferably made, for example, from a flexible plastic. The top frame 114 has a side wall member 116 with socket inserts 118, 120 protruding therefrom. Similarly, the top frame 114 has a side wall member 122 with socket inserts 124, 126 protruding therefrom.

The side wall members 116, 122 and a bottom wall member 128 of the top frame 114 are connected to a glass or plastic cover or covering material 130 that is preferably a plastic sheet that may be either opaque, translucent or transparent. As explained hereinafter, the top frame 114 fits over the frame 80.

The approximate center of the bottom wall member 128 of the top frame 114 is preferably rotatably connected to the approximate center of the member 84 of the frame 80 in any suitable manner. Additionally, the side wall members 94, 96 of the frame 80 have sockets 132, 133, respectively, therein. The arcuate shaped member 81 has sockets 134, 135 therein. The sockets 132–135 are similar to each other.

The cover or covering 130 is placed over the connector 78 located within the frame 80 by rotating the top frame 114 onto the frame 80 to cause the socket inserts 120, 124 to be inserted into the sockets 132, 133, respectively, and the socket inserts 118, 126 to be inserted into the sockets 134, 135, respectively.

While the invention has been particularly shown and described with reference to first and second embodiments thereof, it should be understood by those skilled in the art that changes in form and detail may be made therein without departing from the spirit and scope of the invention.

I claim:

1. A battery terminal post connector that maintains an electrical connection between a battery cable and a terminal post of a battery, comprising:
   an electrically conductive lower body that has a battery terminal post contact surface at its upper end;
   spring means for urging said lower body towards said upper body when said post is disposed therebetween;
   means for connecting said battery cable to said connector; and
   a two piece, non-electrically conductive housing enclosing said upper body and said lower body and having socket insert protrusions connected to one piece of said two piece housing and corresponding sockets located in the other piece of said two piece housing to permit engagement with said socket insert protrusions to connect together both pieces of said two piece housing.

2. The connector of claim 1 wherein said means for connecting comprises:
   a threaded hole in said lower body;
   a cable insertion hole in said lower body that extends from a lower end thereof to intersect said threaded hole; and
   a screw that is screwed into said threaded hole to fixedly contact are exposed, uninsulated end portion of said battery cable.

3. The connector of claim 1 wherein each said battery terminal post contact surface is arcuate.

4. The connector of claim 3 wherein each said battery terminal post contact surface has a radius of curvature that approximates a radius of curvature of said post.

5. The connector of claim 1 wherein said means for urging is a spring.

6. The connector of claim 5 wherein said spring is a coiled spring.

7. The connector of claim 6 wherein said lower body has at least one hole therethrough that extends from a lower end of said lower body to an upper end thereof, said hole having a portion with a reduced diameter and a portion with an enlarged diameter that form a shoulder that is in an abutting relationship with one end of said coiled spring, additionally comprising a rod with a shank that passes substantially axially through said coiled spring and said hole, a distal end of said rod being fixedly connected to said upper member, said rod having an enlarged proximal end that forms a shoulder that is in an abutting relationship with the other end of said spring.

8. The connector of claim 7 wherein said at least one hole being two holes provided through said lower body.

9. A battery terminal post connector that maintains an electrical connection between a battery cable and a terminal post of a battery, comprising:
   an electrically conductive upper body that has a battery terminal post contact surface at its lower end;
   an electrically conductive lower body that has a battery terminal post contact surface at its upper end;
   means for urging said lower body towards said upper body when said post is disposed therebetween;
   means for connecting said battery cable to said connector;
   said means for urging is a spring, said spring is a coiled spring, and additionally comprising a retention frame wherein each body is disposed with an upper end of said upper body fixedly connected to an upper member of said retention frame, said coiled spring being disposed between a lower portion of said retention frame and said lower body; said retention frame has at least one socket therein, additionally comprising:

a top frame having a socket insert protrusion that extends therefrom, said top frame having a lower member that is connected to said upper member of said retention frame, said top frame being rotatable to cause said socket insert to be inserted into said socket; and a covering material that is connected to sides of said top frame.

10. The connector of claim 9 wherein said covering material is opaque.

11. The connector of claim 9 wherein said covering material is transparent.

12. The connector of claim 9 wherein said covering material is translucent.

13. The connector of claim 9 wherein said covering material is a plastic sheet cover.

14. The connector of claim 9 wherein said covering material is a glass sheet cover.

15. In the method of maintaining an electrical connection between a battery cable and a terminal post of a battery, the steps of:

providing an electrically conductive upper body;

providing an electrically conductive lower body;

disposing a battery terminal post between said upper body and said lower body;

urging by means of at least one spring said lower body towards said upper body; and enclosing said upper body and said lower body with a two piece, non-electrically conductive housing having socket insert protrusions connected to one piece of said two piece housing and corresponding sockets located in the other piece of said two piece housing to permit engagement with said socket insert protrusions to connect together both pieces of said two piece housing.

16. In the method of claim 15 wherein said upper body has a contact surface at its lower end and said lower body has a contact surface at its upper end, said step of urging including spring biasing said surfaces into contact with said post.

17. In the method of claim 15, the additional steps of:

providing a battery cable insertion hole within said lower body; and connecting said cable to said lower body within said insertion hole.

18. In the method of claim 17, including the step of using the battery cable to pull said lower body away from said upper body to provide a quick connect/quick disconnect between said upper body and said lower body and said terminal post.

19. In the method of claim 15 wherein two springs are provided for urging said lower body towards said upper body.

* * * * *